United States Patent
Hussein et al.

[11] Patent Number: 6,018,474
[45] Date of Patent: Jan. 25, 2000

[54] SWITCHING DEVICE

[75] Inventors: Khalid Hassan Hussein, Fukuoka; Tooru Iwagami; Mitsutaka Iwasaki, both of Tokyo; Kazuaki Hiyama, Fukuoka, all of Japan

[73] Assignee: Mitsubishi Denki Kabushiki Kaisha, Tokyo, Japan

[21] Appl. No.: 09/325,879

[22] Filed: Jun. 4, 1999

[30] Foreign Application Priority Data

Jan. 26, 1999 [JP] Japan ................ P11-016820

[51] Int. Cl.$^7$ .................................................. H02M 7/537
[52] U.S. Cl. ................... 363/131; 363/16; 363/17
[58] Field of Search .................... 363/16, 17, 49, 363/55, 56, 58, 97, 98, 131, 132; 232/282, 908

[56] References Cited

FOREIGN PATENT DOCUMENTS

| 3-150075 | 6/1991 | Japan . |
| 4-138068 | 5/1992 | Japan . |
| 6-253553 | 9/1994 | Japan . |

Primary Examiner—Y. J. Han
Attorney, Agent, or Firm—Oblon, Spivak, McClelland, Maier & Neustadt, P.C.

[57] ABSTRACT

A capacitive element is charged with no excessive flow of current so that a potential to effect the operation of a switching element can be obtained with stability. A capacitor (30) is charged with a circulating current from a load (40). On the charging path, a resistor (21) is provided in series to prevent an excessive flow of the charging current. Between terminals ($V_B$, $V_S$) of an upper-arm driving circuit (25) which receive a voltage to effect the operation of an IGBT (34) of an upper arm, the capacitor (30) and the resistor (21) are provided to suppress a decrease in potential ($V_B$) at the terminal ($V_B$).

16 Claims, 15 Drawing Sheets

F I G. 6A
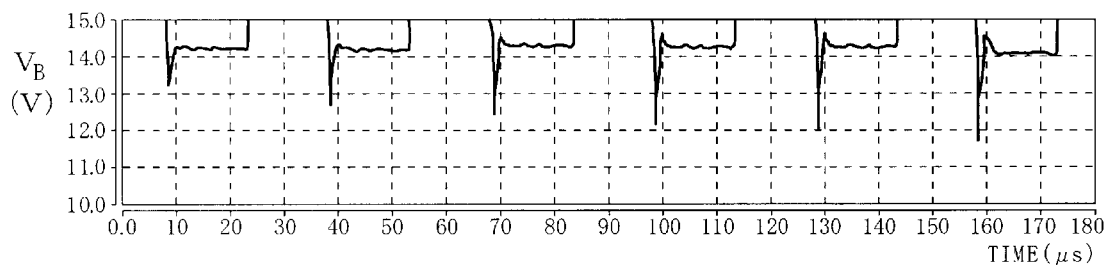
F I G. 6B
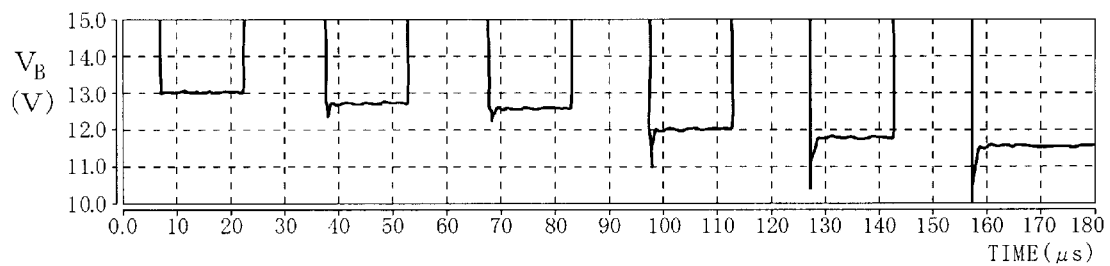
F I G. 6C
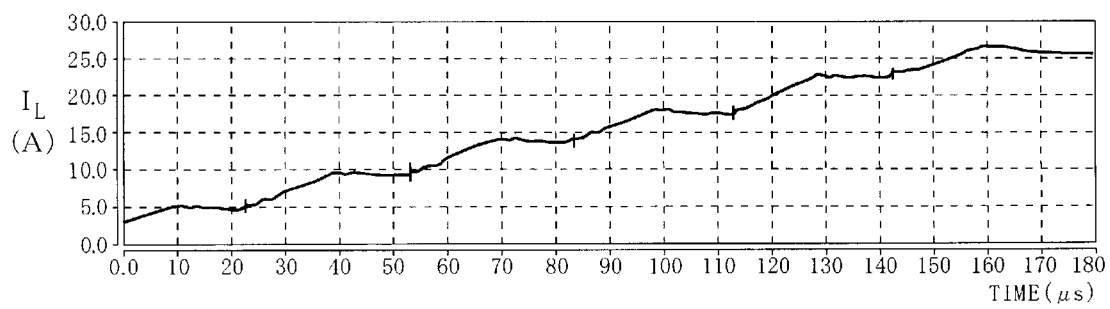

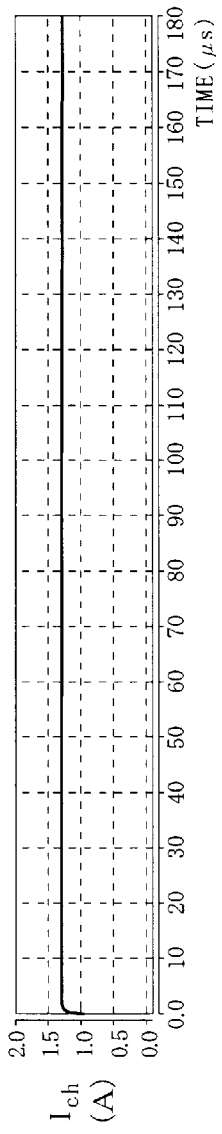
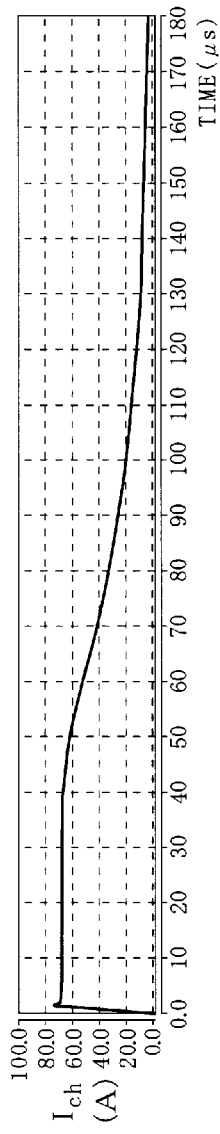
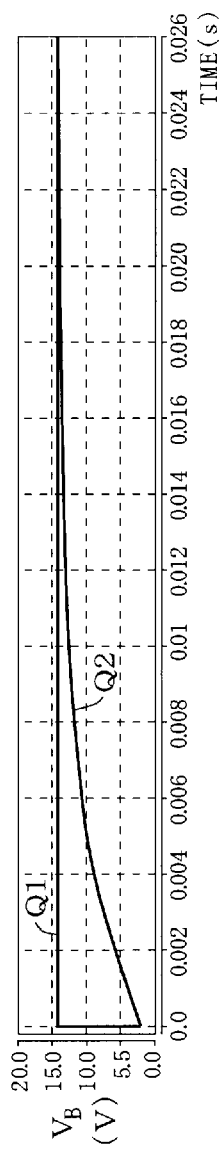
FIG. 7A
FIG. 7B
FIG. 7C

F I G . 15
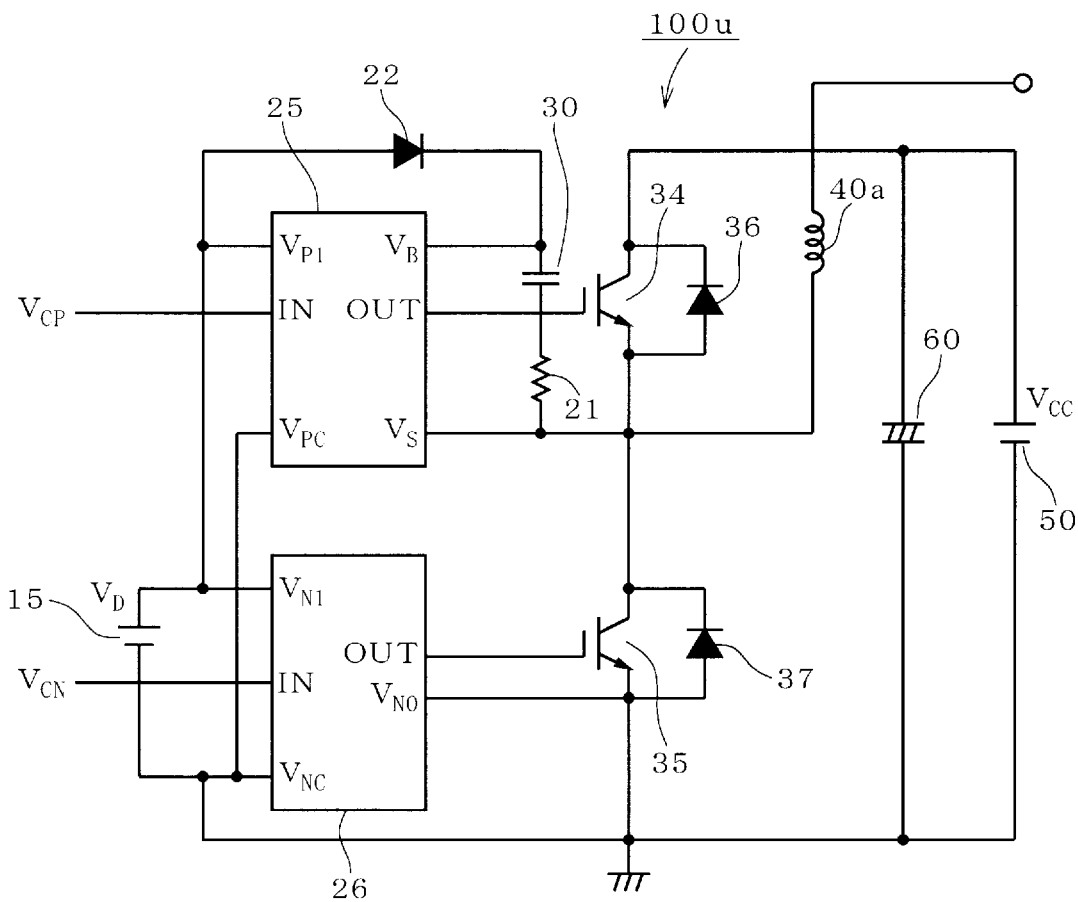

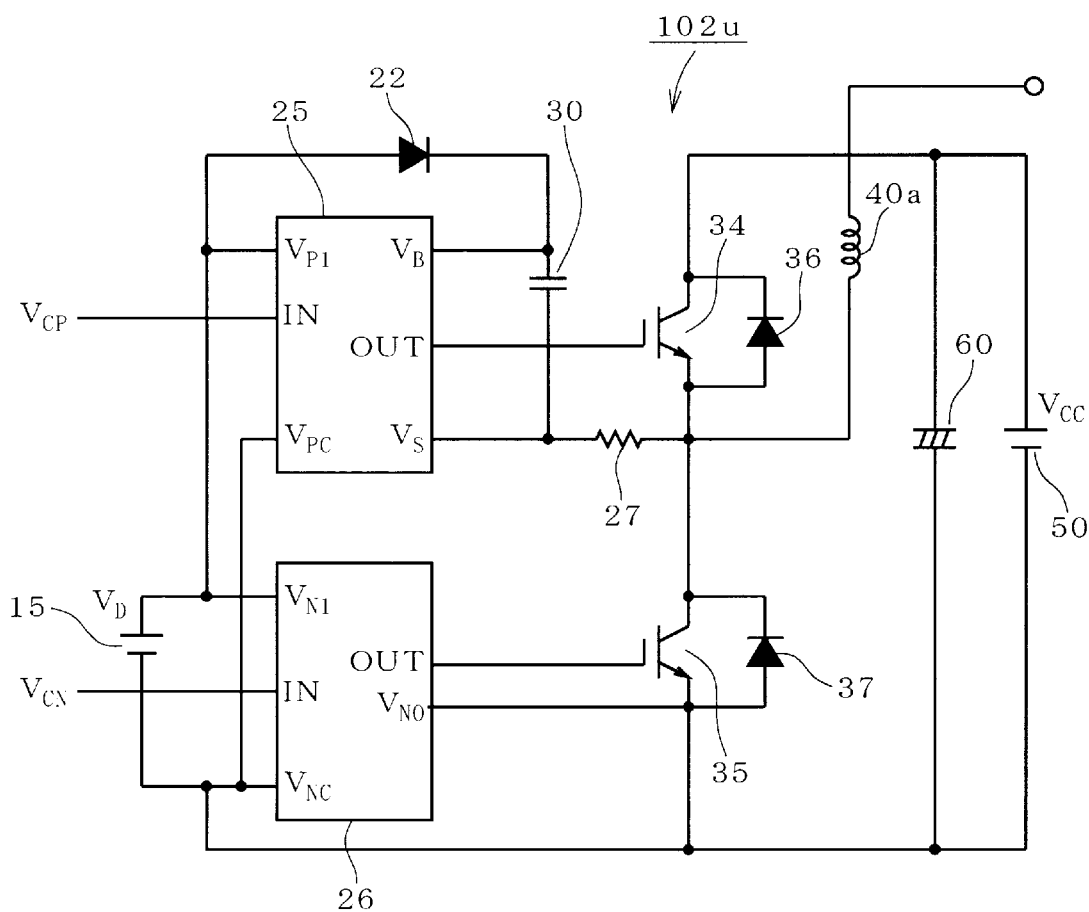
F I G . 17

PRIOR ART FIG. 19
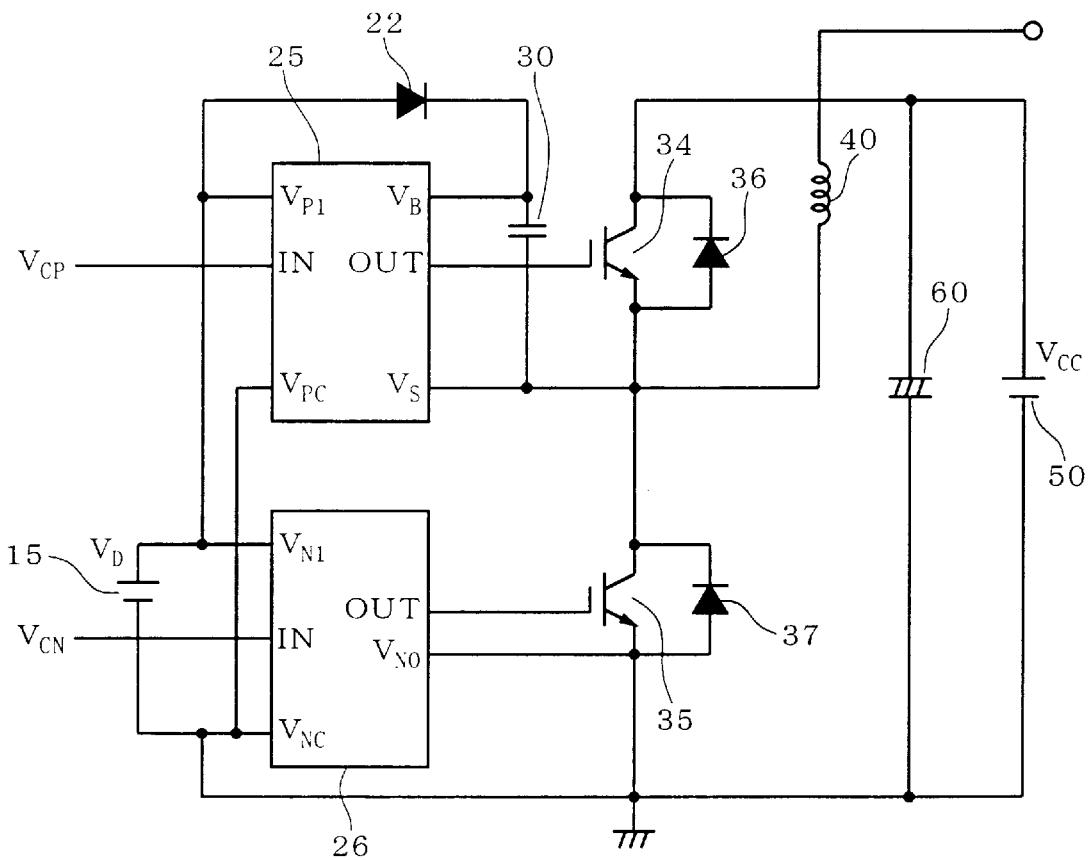
PRIOR ART FIG. 20
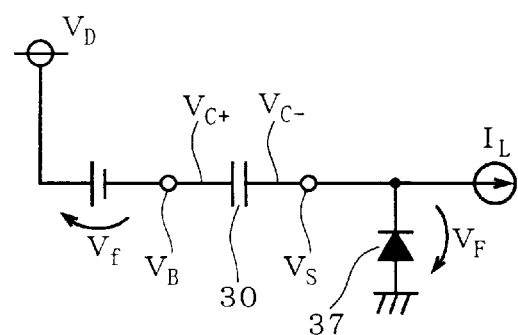

PRIOR ART FIG. 21
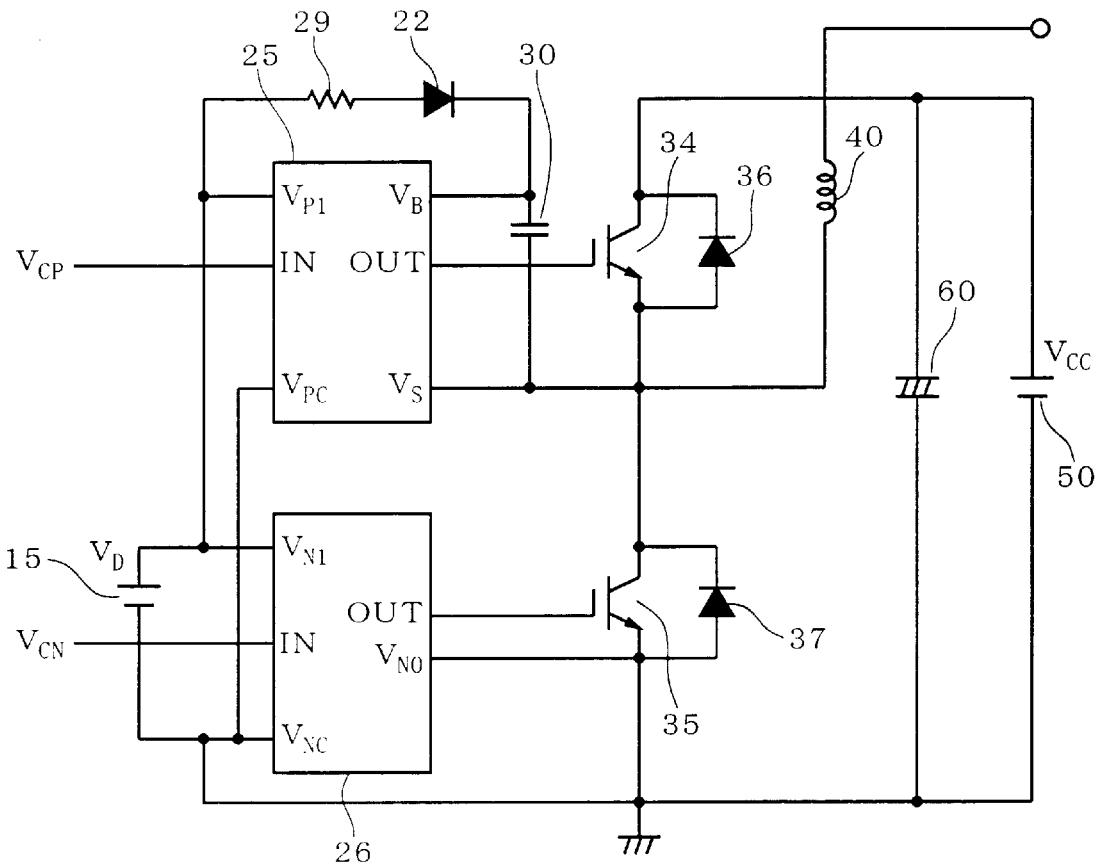
PRIOR ART FIG. 22
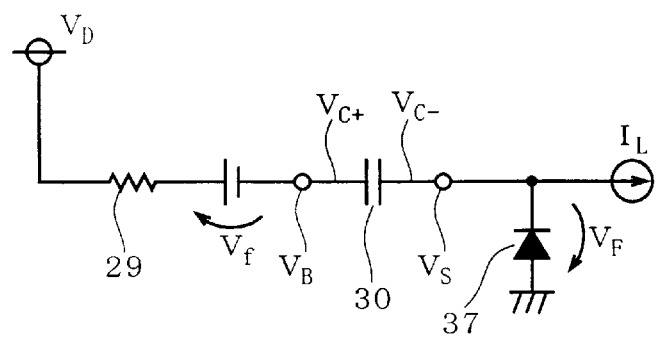

SWITCHING DEVICE

BACKGROUND OF THE INVENTION

1. Field of the Invention

The present invention relates to an inverter circuit, or a switching device comprising upper and lower arms which is employed in an inverter of a converter circuit. Especially, the invention relates to a technique for driving the upper arm on the basis of a voltage across a capacitive element which is charged by the operation of the lower arm.

2. Description of the Background Art

There has been a previously known technique for driving a circuit to drive a switching element of the upper arm on the basis of the voltage across the capacitive element which is charged by the operation of a switching element of the lower arm.

FIG. 19 is a circuit diagram showing a switching technique disclosed for example in Japanese Patent Laid-open No. 3-150075A or 6-253553A. In FIG. 19, a capacitive element, namely capacitor 30, is charged with a voltage $V_D$ delivered by a power supply 15 via a blocking diode 22 when a switching element of the lower arm, namely insulated gate bipolar transistor (hereinafter referred to as "IGBT") 35, is conducting. When a switching element of the upper arm, namely IGBT 34, is conducting, the IGBT 35 of the lower arm is non-conducting. Thus, the voltage across the capacitor 30 is kept and on the basis of that voltage, an upper-arm driving circuit 25 drives the gate of the IGBT 34 of the upper arm.

The circuit of FIG. 19, however, has a first problem that the current charging the capacitor 30 becomes excessive in early stages of the operation because it is limited only by internal impedance of the power supply 15 and respective on-state impedance of the locking diode 22 and the IGBT 35 of the lower arm. This adversely affects the power supply 15.

A second problem is that part of a circulating current flowing from a load 40 to the capacitor 30 during the IGBT 34 of the upper arm is off becomes excessive. FIG. 20 is an equivalent circuit diagram for the circuit of FIG. 19 during both the IGBTs 34 and 35 are in the off state, i.e., in conditions of so-called interlock or dead band.

The circulating current $I_L$ from the load 40 branches to the free-wheeling diode 37 and to the capacitor 30. When the capacitor 30 has previously been charged by the conduction of the IGBT 35, a potential $V_{C+}$ of the capacitor 30 closer to the blocking diode 22 and a potential $V_{C-}$ of the capacitor 30 far from the blocking diode 22 can be expressed as:

$$V_{C+}=V_D-V_{22};$$

$$V_{C-}=V_{35}>0$$

where $V_{22}$ is a threshold voltage of the blocking diode 22; and $V_{35}$ is a saturation voltage of the IGBT 35 when turned on.

In this condition, when the circulating current $I_L$ flows from the load 40 to the free-wheeling diode 37, the free-wheeling diode 37 causes a voltage $V_F$ in proportion to the current flowing therethrough. Since the cathode of the free-wheeling diode 37 is directly connected to one end of the capacitor 30 far from the blocking diode 22, the potential $V_{C-}$ is immediately lowered from $V_{35}$ (>0) to $-V_F$ (<0). This causes a large flow of charging current $I_{ch}$ from the power supply 15. Here the blocking diode 22 causes a voltage $V_f$.

To resolve these problems, a technique for providing a current-limiting element, e.g., resistor, has also been proposed to prevent an excessive flow of current between the power supply 15 and the capacitor 30.

FIG. 21 is a circuit diagram showing a switching technique disclosed for example in Japanese Patent Laid-open No. 4-138068A. As compared with the circuit of FIG. 19, the circuit of FIG. 21 is configured in such a manner that a resistor 29 is inserted in series between the anode of the blocking diode 22 and the positive electrode of the power supply 15. The presence of the resistor 29 relieves the excessive flow of current, resolving the aforementioned first and second problems.

In the structure of FIG. 21, however, the third problem has arisen that the resistor 29 lowers a potential $V_B$ at the junction between the capacitor 30 and the cathode of the blocking diode 22, out of two potentials $V_B$ and $V_S$ on the basis of which the upper-arm driving circuit 25 drives the gate of the IGBT 34 of the upper arm.

FIG. 22 is an equivalent circuit diagram for the circuit of FIG. 21 during both the IGBTs 34 and 36 are off. When the blocking diode 22 causes the voltage $V_f$ in proportion to the charging current $I_{ch}$ from the power supply 15, the potential $V_B$ of the capacitor 30 is given by the following equation:

$$V_B=V_D-V_f-I_{ch}\times R_{ch}$$

where $R_{ch}$ is a resistance value of the resistor 29. As compared with the circuit of FIG. 20, the potential $V_B$ is lowered by $I_{ch}\times R_{ch}$.

A noticeable decrease in the potential $V_B$ (third problem) may damage the upper-arm driving circuit 25.

SUMMARY OF THE INVENTION

A first aspect of the present invention is directed to a switching device comprising: a first switching element having a first end to receive a first potential and a second end connected to one end of a load to be driven, the first switching device establishing or breaking continuity between the first and second ends thereof; a first diode having a cathode connected to the second end of the first switching element and to the one end of the load, and an anode receiving a second potential lower than the first potential and connected to the other end of the load; a power supply having a first end to supply a third potential higher than the second potential and a second end connected to the anode of the first diode; a second diode having an anode connected to the first end of the power supply, and a cathode; a first driving circuit having a first end connected to the cathode of the second diode and a second end connected to the second end of the first switching element, the first driving circuit bringing the first switching element into conduction intermittently on the basis of a potential difference between the first and second ends of the first driving circuit; and a capacitive element and a first current-limiting element which are connected in series between the first end of the first driving circuit and the second end of the first switching element.

According to a second aspect of the present invention, in the switching device of the first aspect, the capacitive element is directly connected to the second end of the first driving circuit.

According to a third aspect of the present invention, the switching element of the first and second aspects further comprises: a Zener diode having a cathode connected to the first end of the first driving circuit and an anode connected to the second end of the first driving circuit.

In the switching device of the first aspect, the capacitive element is charged with the circulating current from the load during the switching element is non-conducting. With the charged capacitive element, the switching driving circuit can obtain a potential difference to effect the operation of the switching element. Since the current-limiting element is connected in series with the capacitive element, damage to the power supply caused by the excessive flow of current in early stages of charging the capacitive element can be prevented. In addition, since the current-limiting element is provided between the first end of the driving circuit and the second end of the first switching element, voltage drop at the current-limiting element does not affect the potential at the first end which effects the operation of the switching element.

The switching device of the second aspect suppresses the decrease in the potential at the second end of the driving circuit.

In the switching device of the third aspect, a noticeable decrease in the potential at one end of the load causes the Zener diode to be conductive in a reverse direction. This prevents a sharp increase in the voltage between the first and second ends of the driving circuit.

Thus, an objective of the present invention is to resolve the aforementioned first to third problems and to provide a technique for charging the capacitive element without an excessive flow of current so that a potential to effect the operation of the switching element can be obtained with stability.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A through 6C and 7A through 7C are graphs illustrating the effects of the switching device of the first preferred embodiment.

FIG. 15 is a circuit diagram showing part of the structure of the switching device of the third preferred embodiment.

FIGS. 16 through 18 are circuit diagrams showing modifications of the third preferred embodiment.

FIGS. 19 and 21 are circuit diagrams showing a conventional technique.

FIGS. 20 and 22 are equivalent circuit diagrams showing the conventional technique.

DESCRIPTION OF THE PREFERRED EMBODIMENTS

1. First Preferred Embodiment

Figure 1:
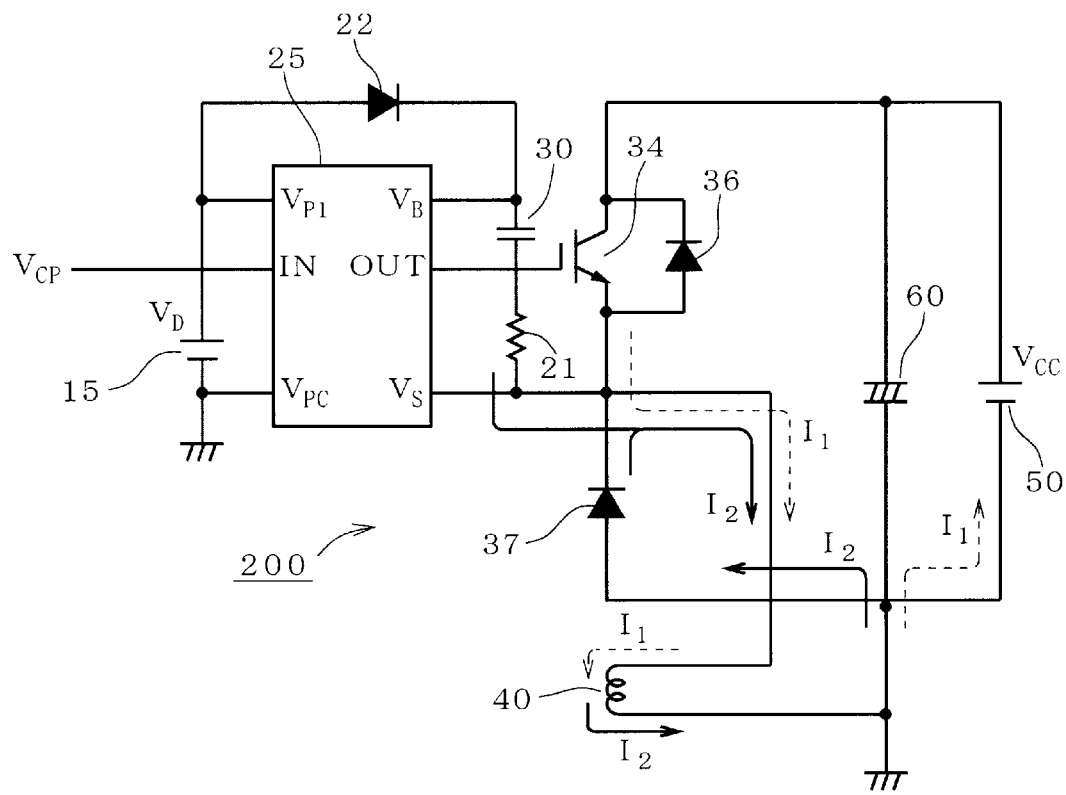
FIG. 1 is a circuit diagram showing the structure of a switching device according to a first preferred embodiment.

FIG. 1 is a circuit diagram showing the structure of a switching device 200 according to a first preferred embodiment, and the connection thereof to a load 40. The load 40 is provided between the emitter of a switching element, namely IGBT 34, and the cathode of a free-wheeling diode 37. For instance, the load 40 may be a dc motor. The switching device 200 functions as a so-called chopper, which may be regarded also as a DC-DC converter.

The collector of the IGBT 34 and the anode of the free-wheeling diode 37 are connected to positive and negative electrodes of a power supply 50, respectively. The power supply 50 delivers, for example, a direct voltage $V_{cc}$ which is converted from an ac voltage by a converter such as a diode bridge. The voltage $V_{CC}$ is not strictly a direct voltage but may include pulsating components. In order to reduce the pulsing components, a capacitor (e.g., electrolytic capacitor) 60 is provided across the power supply 50.

Accompanied with the IGBT 34, a free-wheeling diode 36 is provided. That is, the collector and emitter of the IGBT 34 are connected to the cathode and anode of the free-wheeling diode 36, respectively.

The IGBT 34 is turned on or off by an upper-arm driving circuit 25. To drive the upper-arm driving circuit 25, a voltage $V_D$ is supplied from a power supply 15 to power terminals $V_{P1}$ and $V_{PC}$ of the upper-arm driving circuit 25.

A voltage determining potentials applied to the gate of the IGBT 34 to drive the IGBT 34 is separately applied to the upper-arm driving circuit 25. More specifically, potentials $V_B$ and $V_S$ are applied to the upper-arm driving circuit 25. For the sake of clarity, input terminals to receive these potentials are denoted by the same reference characters as the applied potentials.

Between the input terminal $V_B$ and the emitter of the IGBT 34, a capacitor 30 and a resistor 21 are connected in series. That is, the capacitor 30 is connected at its one end to the input terminal $V_B$ and at its other end to one end of the resistor 21. The other end of the resistor 21 is connected to the emitter of the IGBT 34. In the structure of FIG. 1, the other end of the resistor 21 is also connected to the input terminal $V_S$. Further, a blocking diode 22 is inserted between the power supply 15 and the capacitor 30.

The cathode of the blocking diode 22 is connected to the input terminal $V_B$, and the anode of the blocking diode 22 is connected to the positive electrode of the power supply 15 and to the power terminal $V_{P1}$ of the upper-arm driving circuit 25.

The upper-arm driving circuit 25 receives a clock signal $V_{CP}$ at its clock input terminal IN. Then, the timing of activation/inactivation of the clock signal $V_{CP}$ determines the timing of potential transition at the control output end OUT of the upper-arm driving circuit 25, i.e., the timing of potential transition at the gate of the IGBT 34.

Now, we will describe the operation. When the IGBT 34 is in the on state by the activation of the clock signal $V_{CP}$, a load current $I_L$ flows through the positive electrode of the power supply 50, the IGBT 34, the load 40, and the negative electrode of the power supply 50 in this order. In FIG. 1, this flow of current is shown as current $I_1$ by three broken lines. When the IGBT 34 is in the off state by the inactivation of the clock signal $V_{CP}$, on the other hand, the load current $I_L$ flows not only as a circulating current through the free-wheeling diode 37 but also as a current drawn from the positive electrode of the power supply 15 through the blocking diode 22, the capacitor 30, and the resistor 21. In FIG. 1, this flow of current is shown as current $I_2$ by three solid lines, one of which is bifurcated.

Figure 2:
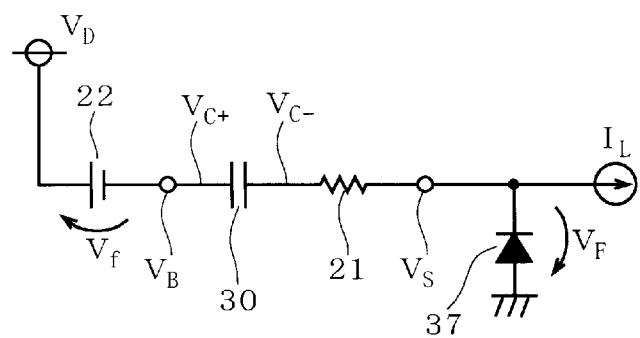
FIG. 2 is an equivalent circuit diagram for the switching device of the first preferred embodiment.

FIG. 2 is an equivalent circuit diagram when the current $I_2$ flows, i.e., when the IGBT 34 of the upper arm is off and thus the circulating current $I_L$ flows from the load 40 to the free-wheeling diode 37. With respect to the potential $V_D$ supplied from the positive electrode of the power supply 15, the potential $V_B$ is lowered by a voltage $V_f$ which is caused by the blocking diode 22 serving as a virtual power supply. The voltage $V_f$ depends on forward current flowing through the blocking diode 22, i.e., current $I_{ch}$ flowing from the positive electrode of the power supply 15 to charge the capacitor 30. Since one end of the capacitor 30 is connected to the terminal $V_B$, the potential $V_B$ is defined by a potential $V_{C+}$ of the capacitor 30. On the other hand, the potential $V_S$ is defined by a potential of the resistor 21 since one end of the resistor 21 is connected to the terminal $V_S$. The potential $V_S$ is then defined by a voltage $V_F$ caused by the free-wheeling diode 37 on the basis of the current flowing therethrough.

In the aforementioned switching device 200, the presence of the resistor 21 on the charging path of the capacitor 30 as a current-limiting element prevents an excessive flow of charging current, resolving the first and second problems. In addition, since the resistor 21 is located closer to the load 40 than the capacitor end of the capacitator 30, the potential $V_{C+}$ at one end of the capacitor 30, which defines the potential $V_B$, is lowered only by the voltage $V_f$ from the potential $V_D$. Thus, the decrease in the potential $V_B$ is reduced by $I_{ch} \times R_{ch}$, as compared with that in the structure of FIGS. 21 and 22, and as a matter of form, the same as that in the structure of FIGS. 19 and 20. Accordingly, the third problem can also be resolved. Besides, even in comparison with the structure of FIGS. 19 and 20, the charging current flowing through the switching device 200 is reduced by the presence of the resistor 21, so that the voltage $V_f$ on the blocking diode 22 is low. This further suppresses the decrease in the potential $V_B$.

Figure 3A:
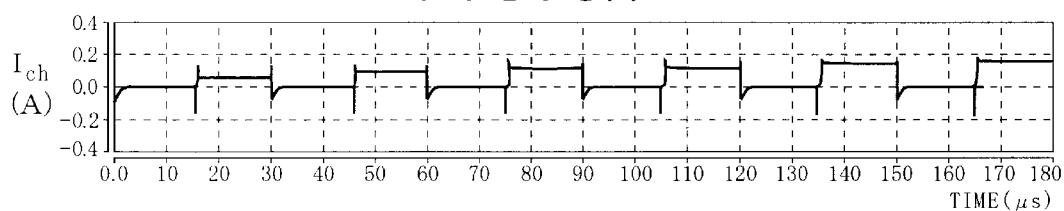
FIGS. 3A through 3E are graphs illustrating the effects of the switching device of the first preferred embodiment.
Figure 3B:
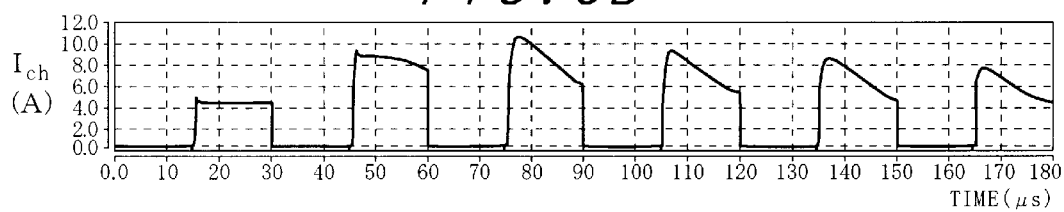
Figure 3C:
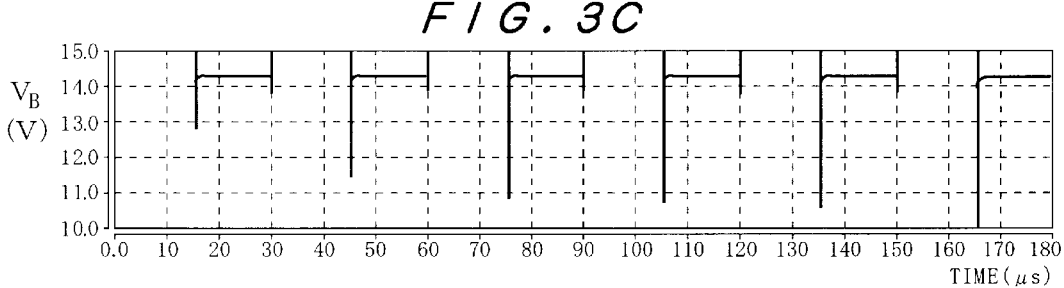
Figure 3D:
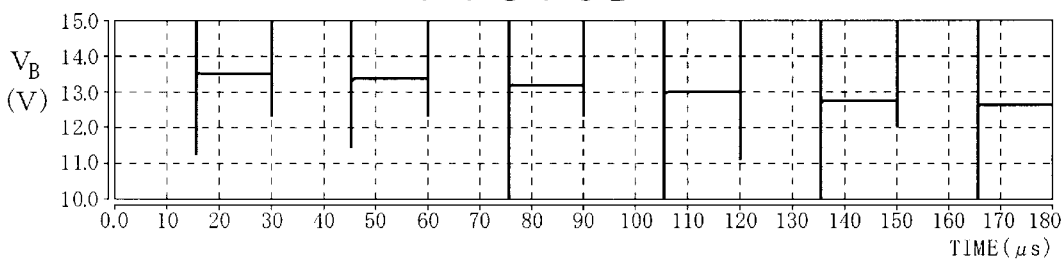
Figure 3E:
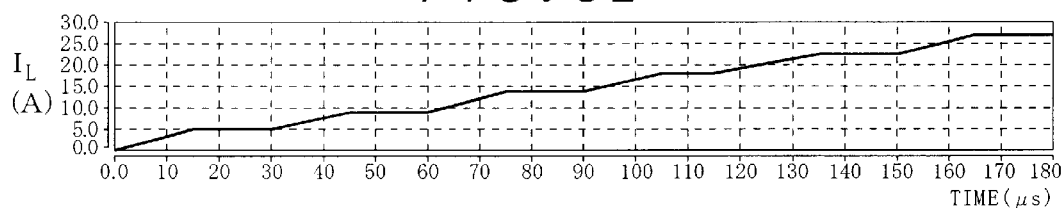

FIGS. 3A through 3E are graphs illustrating simulation results to explain the effects of the first preferred embodiment. FIGS. 3A and 3B show the charging current $I_{ch}$ flowing through the capacitor 30; FIGS. 3C and 3D show the potential $V_B$; and FIG. 3E shows the load current $I_L$. In either case, the IGBT 34 is in the on state between times 30n to 15(2n+1) μs and in the off state between times 15(2n+1)n to 30(n+1) μs, where n=0, 1, 2, 3, . . . .

In the switching device 200, for example, the capacitance value of the capacitor 30 is 470 μF; $V_D$=15 V; and the resistance value of the resistor 21 is 10Ω. The capacitor 30 has previously been charged to 15 V. On the premise that the load 40 is driven at time 0 μs, as shown in FIG. 3E, the load current $I_L$ is held constant when it flows as a circulating current, but it is increasing every time the IGBT 34 is turned on.

Figure 4:
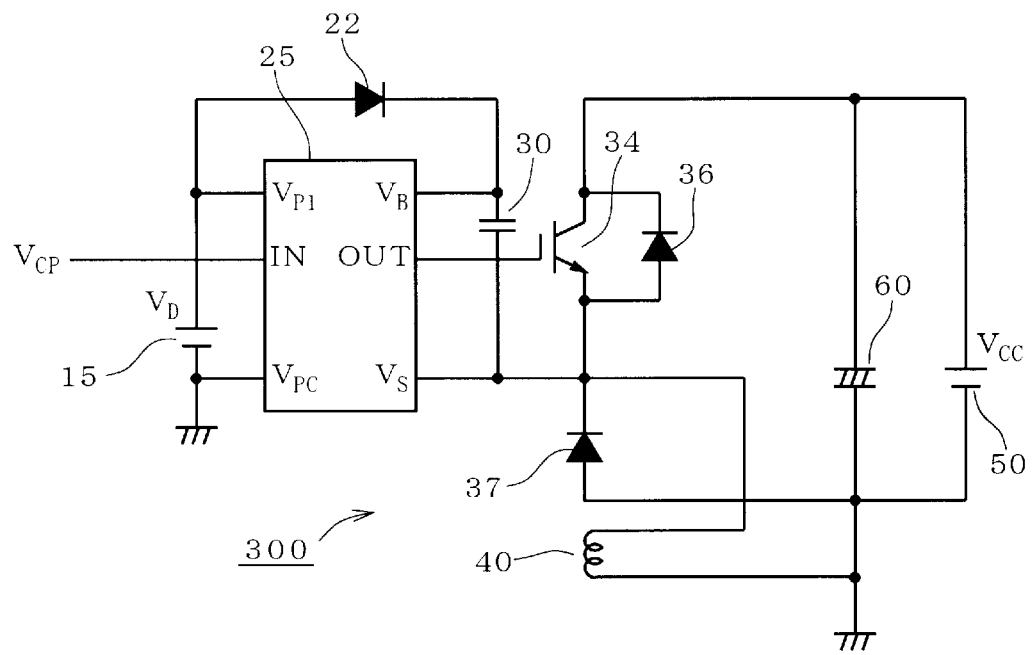
FIGS. 4 and 5 are circuit diagrams showing the structures compared with the switching device of the first preferred embodiment.
Figure 5:
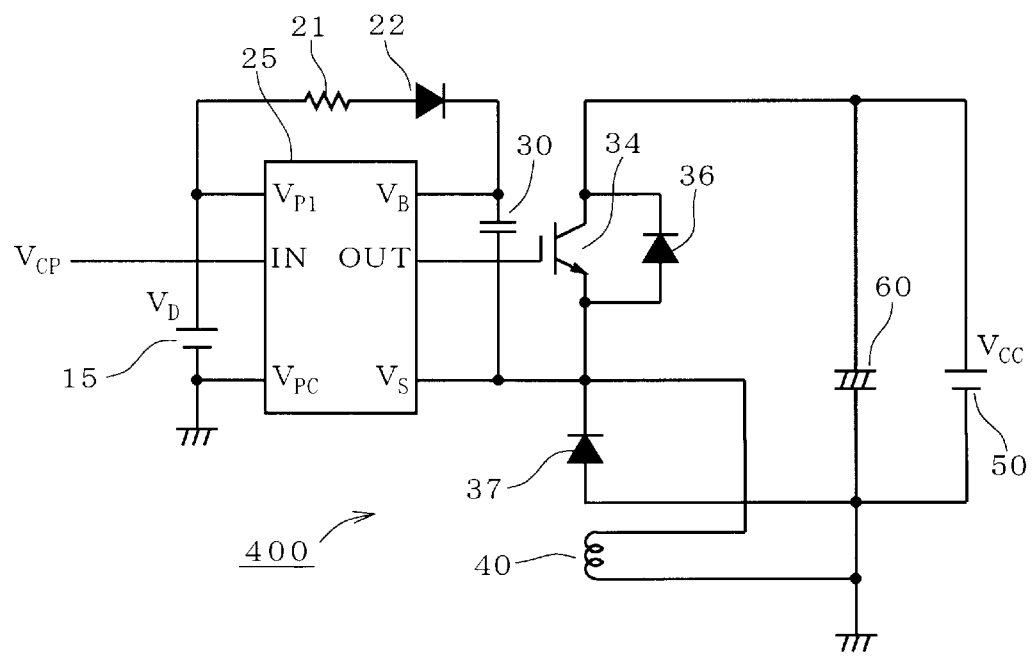

FIGS. 4 and 5 are circuit diagrams showing two circuit configurations to be compared with the switching device 200 of FIG. 3. A switching device 300 of FIG. 4 is a chopper corresponding to the inverter of FIG. 19, which is configured in such a manner that the resistor 21 is eliminated from the switching device 200 (i.e., resistance value=0). A switching device 400 of FIG. 5 is a chopper corresponding to the inverter of FIG. 21, which is configured in such a manner that the resistor 21 of the switching device 200 is moved between the anode of the blocking diode 22 and the power terminal $V_{P1}$ of the upper-arm driving circuit 25.

FIG. 3A shows the case applied both to the switching devices 200 and 400. In either device, the resistor 21 is inserted in series with the capacitor 30 on the charging path, so that there is no difference in the charging current $I_{ch}$ therebetween. On the other hand, the charging current $I_{ch}$ in the switching device 300 with no resistor 21 is shown in FIG. 3B. It is apparent from FIG. 3B that a large current flows in the switching device 300. A comparison between FIGS. 3A and 3B shows that the switching devices 200 and 400 can resolve the second problem.

FIGS. 3C and 3D correspond to the switching devices 200 and 400, respectively. From the drawings, we can see that the decrease in the potential $V_B$ considerably varies depending on the location of the resistor 21 and that the switching device 200 can resolve the third problem.

These results are obtained not only from simulation but also from actual measurement. FIGS. 6A through 6C are graphs illustrating the potential $V_B$ and the load current $I_L$ from experimental results. FIGS. 6A, 6B, and 6C correspond to FIGS. 3C, 3D, and 3E, respectively. Although the on/off cycle or duty of the IGBT 34 is different from that in simulation, like the simulation results, the experimental results show that the switching device 200 can resolve the third problem.

FIGS. 7A through 7C are graphs illustrating the first problem and a solution thereto. Here the charging of the capacitor 30 starts at time 0 μs when the IGBTs 34 in the switching devices (200, 300, 400) are in the off state. For instance, the capacitance value of the capacitor 30 is 470 μF; $V_D$=15 V; the resistance value of the resistor 21 is 10Ω. FIGS. 7A and 7B show fluctuations in the charging current $I_{ch}$ with time; and FIG. 7C shows fluctuations in the potential $V_B$ with time.

FIG. 7A corresponds both to the switching devices 200 and 400. In either device, the resistor 21 is provided in series with the capacitor 30 on the charging path, so that there is no difference in the charging current $I_{ch}$ therebetween. Due to the presence of the resistor 21, the charging current $I_{ch}$ becomes less than 1.5 A. FIG. 7B corresponds to the switching device 300. Since no resistor 21 exists in the device 300, the charging current $I_{ch}$ is considerably high, exceeding 60 A. From these drawings, it is apparent that the switching devices 200 and 400 can resolve the first problem as well.

In FIG. 7C, the curve Q1 corresponds to the switching devices 200 and 300; and the curve Q2 corresponds to the switching device 400. While the switching device 400 resolves the first problem, the rise in the potential $V_B$ therein is considerably slow as compared with that in the switching device 200. Therefore, while FIG. 7 shows the case where the IGBT 34 is off, when the IGBT 34 is turned on or off at intervals of several tens Ms as shown in FIG. 3, the switching device 200 is more advantageous than the switching device 400.

In this fashion, the switching device 200 can resolve all the first to third problems. The voltage between the terminals $V_B$ and $V_S$ may sharply increase with ringing of the potential $V_B$, although it is not clearly shown in the graph of FIG. 6A. In such a case, it is preferable to provide an element for removing surges in the upper-arm driving circuit 25.

Figure 8:
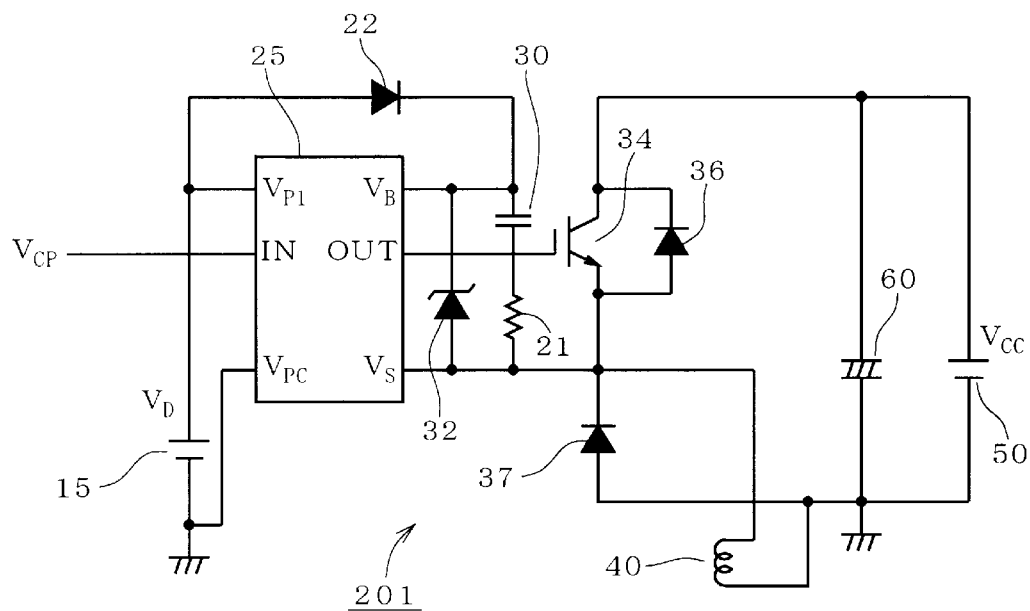
FIG. 8 is a circuit diagram showing a modified structure of the switching device of the first preferred embodiment.

FIG. 8 is a circuit diagram showing the structure of a switching device 201 as a modification of the first preferred embodiment, and the connection thereof to the load 40. The switching device 201 is configured in such a manner that a Zener diode 32 is added to the switching device 200. The cathode and anode of the Zener diode 32 are connected to the terminals $V_B$ and $V_S$ of the upper-arm driving circuit 25, respectively. The presence of the Zener diode 32 prevents application of a large voltage between the terminals $V_B$ and $V_S$ of the upper-arm driving circuit 25.

2. Second Preferred Embodiment

Figure 9:
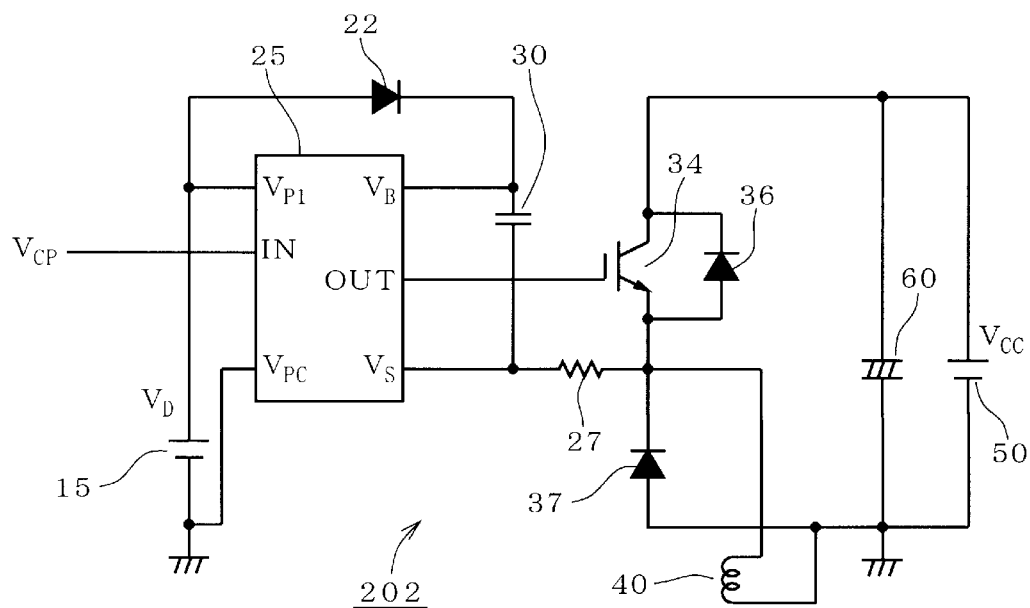
FIG. 9 is a circuit diagram showing the structure of a switching device according to a second preferred embodiment.

FIG. 9 is a circuit diagram showing the structure of a switching device 202 according to a second preferred embodiment, and the connection thereof to the load 40. The switching device 202 is configured in such a manner that the resistor 21 is eliminated from the switching device 200 to connect both ends of the capacitor 30 directly to the terminals $V_B$ and $V_S$ of the upper-arm driving circuit 25, respectively, and a resistor 27 is provided between the terminal $V_S$ of the upper-arm driving circuit 25 and the emitter of the IGBT 34.

Figure 10:
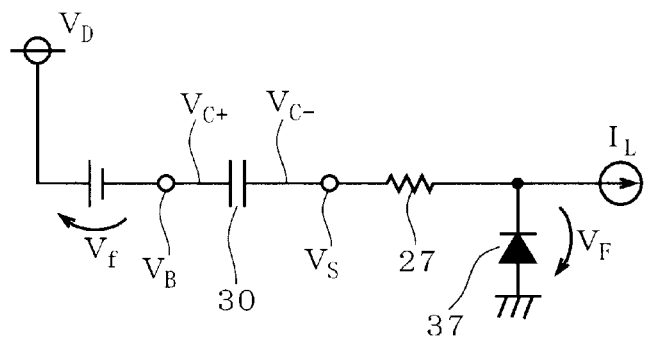
FIG. 10 is an equivalent circuit diagram for the switching device of the second preferred embodiment.

FIG. 10 is an equivalent circuit diagram for the switching device 202, corresponding to FIG. 2. It shows the case where the IGBT 34 is off and thus the load current $I_L$ flows as a circulating current. Since the resistor 27 is located farther from the power supply 15 than the capacitor 30, the switching device 202 can resolve the first to third problems as well as the switching device 200 of the first preferred embodiment. In addition, since the junction between the resistor 27 and the capacitor 30 is directly connected to the terminal $V_S$ of the upper-arm driving circuit 25, the potential $V_S$ becomes equal to the potential $V_{C-}$ of the capacitor 30. This suppresses not only the decrease in the potential $V_B$ but also the decrease in the potential $V_S$.

Figure 11:
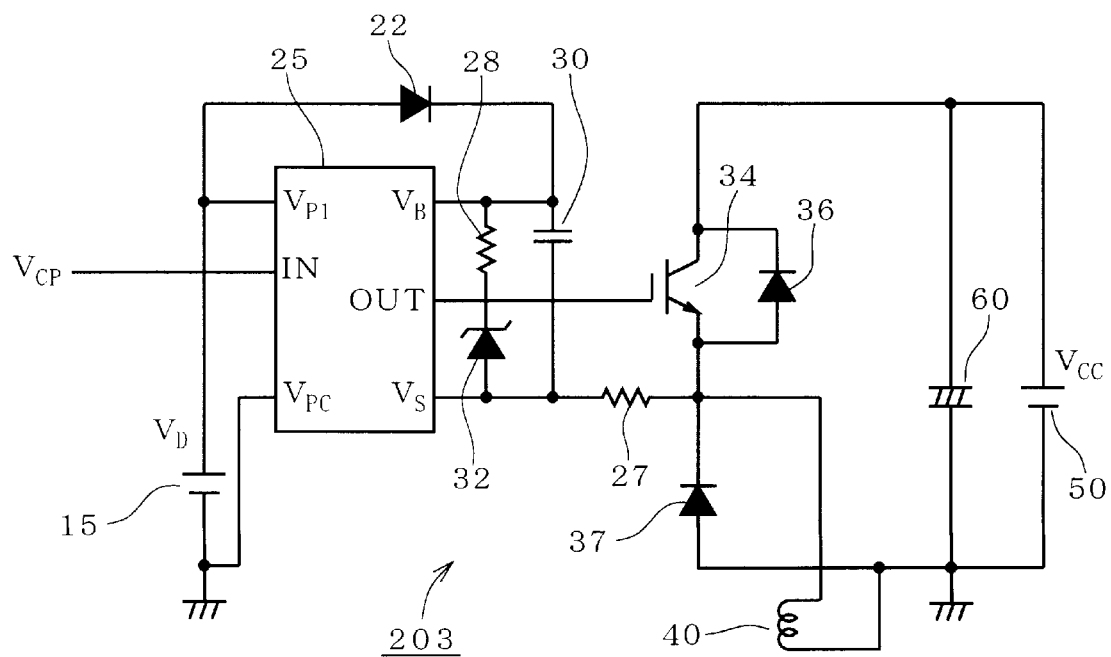
FIG. 11 is a circuit diagram showing a modified structure of the switching device of the second preferred embodiment.

In the second preferred embodiment, also, it is possible to modify the switching device 202 by the addition of the Zener diode 32 to the upper-arm driving circuit 25 as in the first preferred embodiment. FIG. 11 is a circuit diagram showing such a modification, i.e., the structure of a switching device 203, and the connection thereof to the load 40. In the switching device 203, it is preferable to provide a resistor 28 between the cathode of the Zener diode 32 and the terminal $V_B$ of the upper-arm driving circuit 25. This is to prevent an excessive flow of discharge current from the capacitor 30 to the Zener diode 32. In view of switching-element modularization, however, the resistor 21 is superior to the resistor 27. That is, the switching device 200 can facilitate modularization more than the switching device 203.

3. Third Preferred Embodiment

Figure 12:
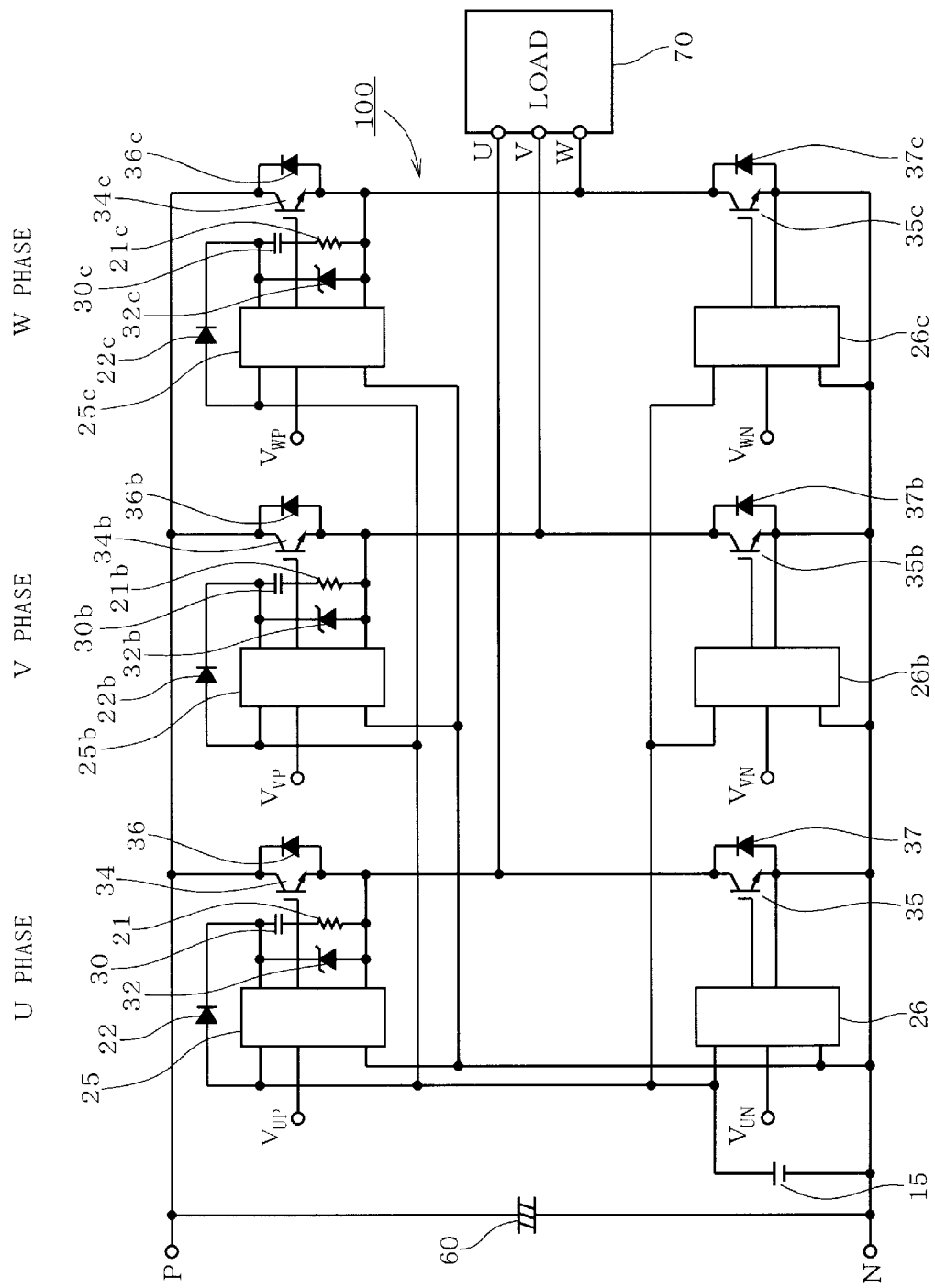
FIG. 12 is a circuit diagram showing the structure of a switching device according to a third preferred embodiment.
Figure 13:
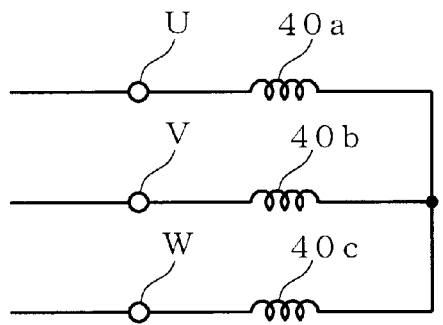
FIGS. 13 and 14 are circuit diagrams illustrating the structure of a load according to the third preferred embodiment.
Figure 14:
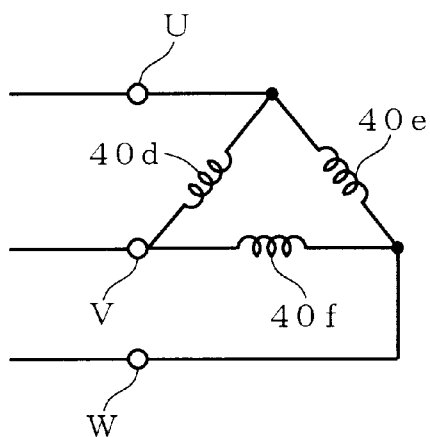

FIG. 12 is a circuit diagram showing the structure of a switching device 100 according to a third preferred embodiment, and the connection thereof to a load 70. Here the load 70 is a three-phase load, e.g., a three-phase motor. FIGS. 13 and 14 are circuit diagrams showing the load 70 with a Y connection and the load 70 with a Δ connection, respectively. In FIG. 13, inductive loads 40a, 40b, and 40c are provided corresponding to U, V, and W phases, respectively. In FIG. 14, inductive loads 40d, 40e, and 40f are provided between U and V phases, between W and U phases, and between V and W phases, respectively.

Corresponding to these three-phase loads, the switching device 100 is divided into three phases: U, V, and W.

FIG. 15 is a circuit diagram showing the structure of a U-phase portion 100u of the switching device 100, and the connection thereof to the load 40a which is part of the three-phase loads of the Y connection. With respect to the switching device 200, the portion 100u of the switching device 100 further comprises a switching element of the lower arm, namely IGBT 35, and a lower-arm driving circuit 26 for driving the IGBT 35. Instead of the load 40, the portion 100u is connected to the load 40a.

The load 40a is connected at its one end to the emitter of the IGBT 34, like the load 40 of the first preferred embodiment. However, the load 40a is part of the three-phase load 70, so that its other end is connected not to the anode of the free-wheeling diode 37 but to the loads 40b and 40c as shown in FIG. 13. In FIG. 13, these connections are shown by open circles.

The collector and emitter of the IGBT 35 are connected to the cathode and anode of the free-wheeling diode 37, respectively. The gate of the IGBT 35 is connected to the lower-arm driving circuit 26 to turn on/off the lower-arm driving circuit 26. To drive the lower-arm driving circuit 26, a voltage $V_D$ is supplied from the power supply 15 to power terminals $V_{N1}$ and $V_{NC}$ of the lower-arm driving circuit 26. The negative electrode of the power supply 15 is connected to the negative electrode of the power supply 50 via the terminal $V_{NC}$ in order to stabilize the operation of the lower-arm driving circuit 26.

The lower-arm driving circuit 26 receives a clock signal $V_{CN}$ at its clock input terminal IN. In FIG. 12, the clock signals $V_{CP}$ and $V_{CN}$ are denoted by $V_{UP}$ and $V_{UN}$, respectively. The clock signals $V_{CP}$ and $V_{CN}$ are activated independently of each other, so that they are never active at the same time even though they can be inactive at the same time. The timing of activation/inactivation of the clock signals $V_{CP}$ and $V_{CN}$ determines the timing of potential transition at the control output ends OUT of the upper-arm driving circuit 25 and the lower-arm driving circuit 26, respectively.

Returning now to FIG. 12, V-phase and W-phase portions of the switching device 100 are configured in the same fashion as the U-phase portion 100u. That is, for the V-phase portion, the reference character "b" is added to all the components in the structure of FIG. 15; and the reference character "c" for the W-phase portion. Further, instead of the clock signals $V_{CP}(V_{UP})$, $V_{CN}(V_{UN})$, clock signals $V_{VP}$, $V_{VN}$ are applied to the upper-arm driving circuit 25b and the lower-arm driving circuit 26b in the V-phase portion, respectively; and clock signals $V_{WP}$ and $V_{WN}$ to the upper-arm driving circuit 25c and the lower-arm driving circuit 26c in the W-phase portion, respectively. A correlation of these six clock signals is as well known in the art so that the description thereof will be omitted.

In the U-phase portion 100u, the load 40a is indirectly connected to the anode of the free-wheeling diode 37 via the loads 40b and 40c, so that the circulating current flows to the free-wheeling diode 37. When the IGBT 35 is off, an equivalent circuit for the U-phase portion 100u is as shown in FIG. 2. Accordingly, by forming the resistor 21 in the portion 100u as in the first preferred embodiment, the first through third problems can be resolved.

The present invention is not limited to the three-phase inverter as shown in FIG. 12, but it is also applicable to a single-phase inverter using two structures of FIG. 15. In this sense, the structure of FIG. 15 is a so-called half-bridge circuit. It is apparent that the same effect can be obtained in either single-phase inverter or three-phase inverter. Further, the circulating current flows even if the load 70 has the Δ connection as shown in FIG. 14. In that case, the obtained effect is obviously the same as described above.

Figure 16:
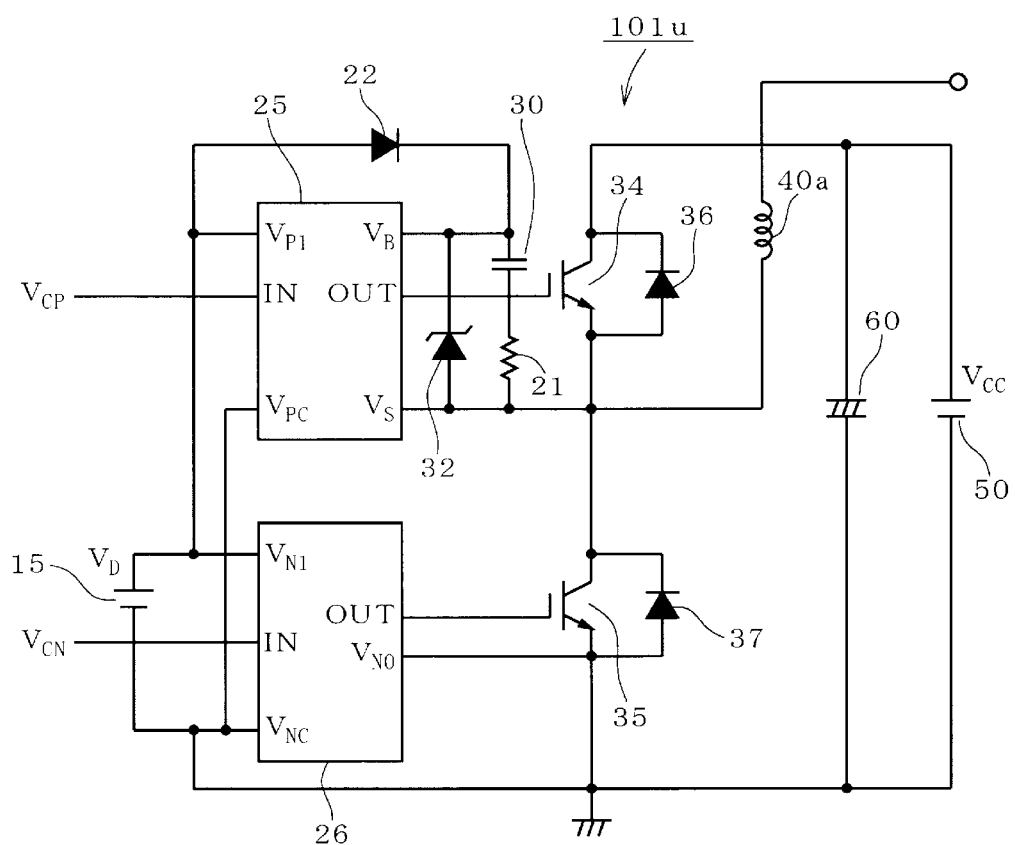

FIG. 16 is a circuit diagram showing a portion 101u obtained by adding the Zener diode 32 to the portion 100u and connecting the cathode and anode of that Zener diode 32 to the terminals $V_B$ and $V_S$, respectively. It is apparent that the same effect as the switching device 201 can be obtained with this structure. The same is true for the portions 100v and 100w with the Zener diode added thereto.

Figure 18:
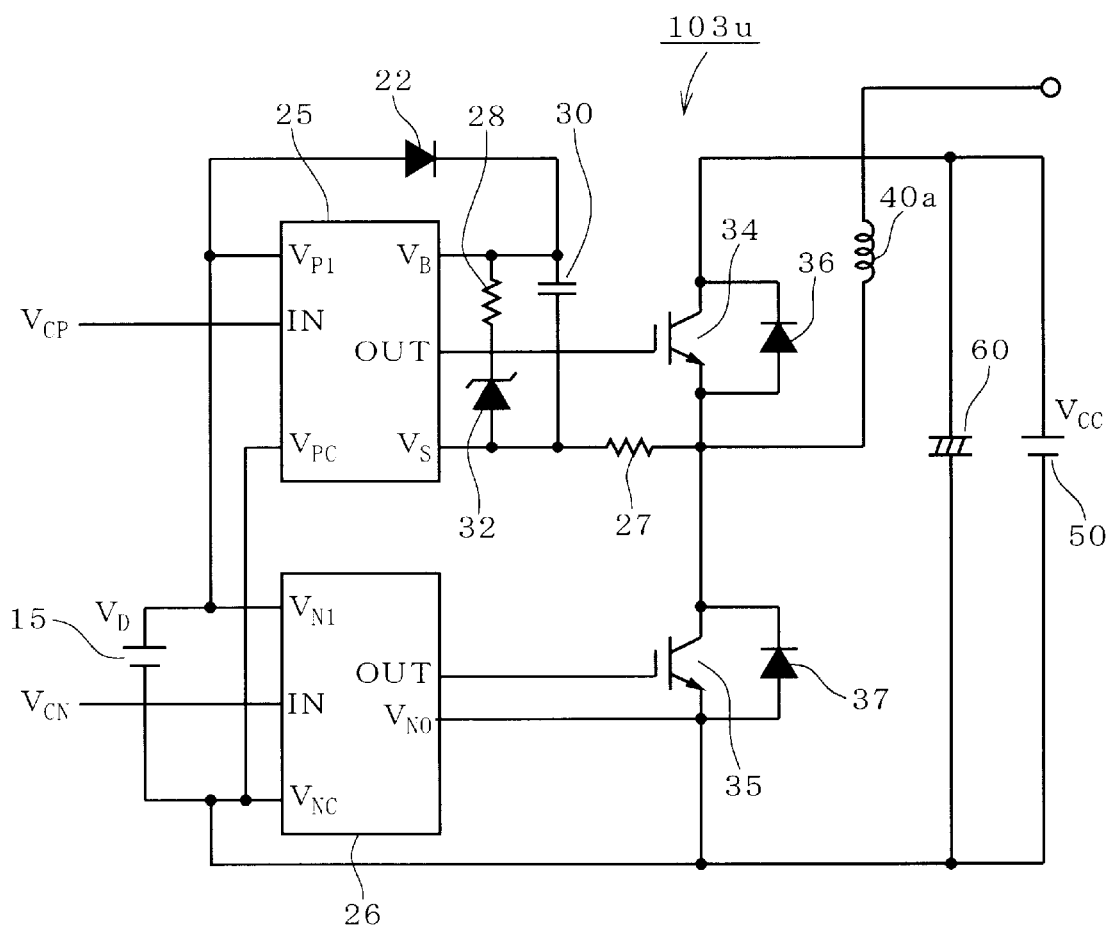

FIGS. 17 and 18 are circuit diagrams showing portions 102u and 103u corresponding to the switching device 202 and 203 of the second preferred embodiment, respectively.

The portion 102u is configured in such a manner that the resistor 21 is eliminated from the portion 100u to connect both ends of the capacitor 30 directly to the terminals $V_B$ and $V_S$ of the upper-arm driving circuit 25, respectively, and a resistor 27 is provided between the terminal $V_S$ of the upper-arm driving circuit 25 and the emitter of the IGBT 34. An equivalent circuit for the portion 102u is thus as shown in FIG. 10, where the same effect as the switching device 202 can be obtained. The portion 103u is configured in such a manner that the series-connected Zener diode 32 and resistor 28 are added to the portion 102u, where the same effect as the switching device 203 can be obtained.

While the invention has been described in detail, the foregoing description is in all aspects illustrative and not restrictive. It is understood that numerous other modifications and variations can be devised without departing from the scope of the invention.

What is claimed is:

1. A switching device comprising:
   a first switching element having a first end to receive a first potential and a second end connected to one end of a load to be driven, said first switching element establishing or breaking continuity between said first and second ends thereof;
   a first diode having a cathode connected to said second end of said first switching element and to said one end of said load, and an anode receiving a second potential lower than said first potential and connected to the other end of said load;
   a power supply having a first end to supply a third potential higher than said second potential and a second end connected to said anode of said first diode;
   a second diode having an anode connected to said first end of said power supply, and a cathode;
   a first driving circuit having a first end connected to said cathode of said second diode and a second end connected to said second end of said first switching element, said first driving circuit bringing said first switching element into conduction intermittently on the basis of a potential difference between said first and second ends of said first driving circuit; and
   a capacitive element and a first current-limiting element which are connected in series between said first end of said first driving circuit and said second end of said first switching element.

2. The switching element according to claim 1, wherein said capacitive element is connected to said second end of said first driving circuit via said first current-limiting element.

3. The switching element according to claim 2, further comprising:
   a Zener diode having a cathode connected to said first end of said first driving circuit and an anode connected to said second end of said first driving circuit.

4. The switching device according to claim 1, wherein said capacitive element is directly connected to said second end of said first driving circuit.

5. The switching device according to claim 4, further comprising:
   a Zener diode having a cathode connected to said first end of said first driving circuit and an anode connected to said second end of said first driving circuit.

6. The switching device according to claim 5, further comprising:
   a second current-limiting element inserted between said cathode of said Zener diode and said first end of said first driving circuit.

7. The switching device according to claim 1, further comprising:
   a second switching element having a first end connected to said cathode of said first diode and a second end connected to said anode of said first diode, said second switching element establishing or breaking continuity between said first and second ends thereof; and
   a second driving circuit bringing said second switching element into conduction exclusively to said first switching element.

8. The switching element according to claim 7, wherein said capacitive element is connected to said second end of said first driving circuit via said first current-limiting element.

9. The switching element according to claim 8, further comprising:
   a Zener diode having a cathode connected to said first end of said first driving circuit and an anode connected to said second end of said first driving circuit.

10. The switching device according to claim 7, wherein said capacitive element is directly connected to said second end of said first driving circuit.

11. The switching device according to claim 10, further comprising:
    a Zener diode having a cathode connected to said first end of said first driving circuit and an anode connected to said second end of said first driving circuit.

12. The switching device according to claim 11, further comprising:
    a second current-limiting element inserted between said cathode of said Zener diode and said first end of said first driving circuit.

13. The switching device according to claim 7, wherein said load is a multi-phase load.

14. The switching device according to claim 13, wherein said load is a three-phase load.

15. The switching device according to claim 14, wherein said load has a star connection.

16. The switching device according to claim 14, wherein said load has a delta connection.

* * * * *